Patented Aug. 26, 1952

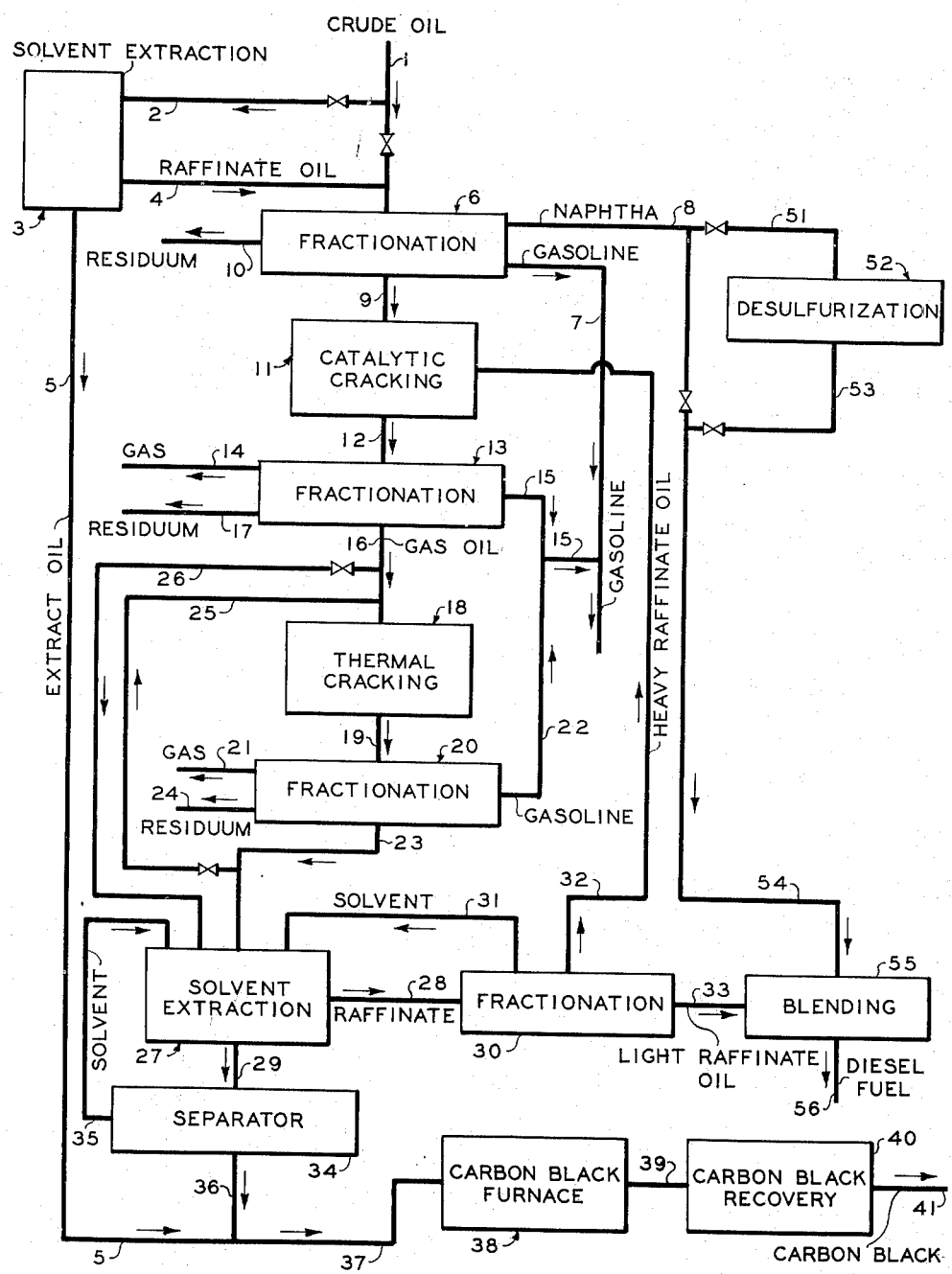

2,608,470

UNITED STATES PATENT OFFICE 2,608,470

CONVERSION OF HYDROCARBON OIL TO DIESEL FUEL AND CARBON BLACK

Carl J. Helmers and Eugene V. Mathy, Bartlesville, Okla., assignors to Phillips Petroleum Company, a corporation of Delaware Application October 1, 1948, Serial No. 52,188

1 Claim. (Cl. 23—209.6)

This invention relates to hydrocarbon conversion. In one of its more specific aspects it relates to the conversion of hydrocarbons in the preparation of quality diesel fuel stocks. In a still more specific aspect it relates to a conversion process which results in the simultaneous production of quality diesel fuel stocks and a stock suitable for the manufacture of quality carbon black.

An object of this invention is to provide a process for the preparation of a highly aromatic stock for use in the production of carbon black. Another object of this invention is to provide a method for the preparation of a highly aromatic feed stock for use in the production of carbon black according to the method described in U. S. Patents 2,419,565 and 2,375,795. Still another object of our invention is to provide a process for the production of a highly aromatic carbon black producing feed stock in high yield and with the production of other valuable products. Other objects and advantages of our invention will be apparent to those skilled in the art upon reading the following description which, taken in conjunction with the attached drawing, forms a part of this specification.

Referring now to the drawing, a fractionation zone is identified by reference numeral 6. A line 9 connects this zone with a catalytic cracking zone 11, which is followed by a fractionation zone 13. A pipe 16 connects the fractionation zone 13 with a thermal cracking zone 18. Products of thermal cracking zone pass through a line 19 into a fractionation zone 20. A solvent extraction zone 27 follows the fractionation zone 20. Two fractionation or separation zones 30 and 34 treat products from the extraction zone 27. Material leaving the separator 34 passes to a carbon black production apparatus 38. Effluent therefrom passes to a recovery apparatus 40.

A solvent extraction zone 3 is connected by lines 2 and 4 to the charge oil line 1. A desulfurization zone 52 is connected with the fractionation zone 6. These fractionation zones, catalytic cracking, thermal cracking, and solvent extraction are conventional processes well known to those skilled in the art. For example, fractionation zones 6, 13, 20 and 30 are conventional fractionators composed of one or more columns as required. The catalytic cracking zone 11 may utilize synthetic or natural clay catalyst, silica alumina or bauxite type catalysts, either stationary or mobile, and the operation of this cracking zone is carried out taking into consideration the particular catalyst used and the depth of cracking desired. The thermal cracking zone 18 is similarly operated, that is, operating temperatures and residence time of stock undergoing conversion will be determined by the type of feed stock, the depth of cracking desired, etc. The solvent extraction steps 3 and 27 may also be conventional extraction processes such as those using furfural, "methylcellosolve," acetonitrile, or the like. The operating conditions for these steps may be determined by the degree of extraction desired. The separator 34 may be a simple fractionator column and it may be operated for the sole purpose of separating liquid solvent from the extracted hydrocarbon materials. The carbon black recovery apparatus 40 may be a Cottrell electrostatic precipitator or it may be a bag filter system or any other separator means or combination which may be deemed desirable and suitable for the separation of carbon black from the hot gases issuing from the conversion chamber 38. The desulfurization zone 52 may be any type of desulfurizer desired, such as a catalytic desulfurization process using a bauxite catalyst. Many connecting lines, valves, pressure and temperature measuring and controlling apparatus are not shown for purposes of simplicity since the proper location and operation of such apparatus is well understood by those skilled in the art. The materials of construction of the various pieces of equipment may be selected from among those commercially available as required by the specific process steps taking place in each unit. Due consideration should be given, however, to sulfur corrosion or corrosion from any other sources.

In the operation of our process for the production of a highly aromatic carbon black producing feed stock a crude oil from a source, not shown, enters our system through a charge line 1. This charge line may be connected with a preheater, also not shown, so that the crude oil may be preheated to proper temperature for fractionation in the fractionator 6. In the fractionator 6 the fractionator bottoms may be withdrawn through a line 10 for passage to a residuum storage, not shown. A gasoline fraction boiling below about 350° F. may be withdrawn through the line 7 and passed to storage or other processing, as desired. A naphtha fraction having an initial boiling point of about 350° F. and an end point between about 450° F. and 500° F. is withdrawn through a line 8 and may or may not be passed through a line 51 into the desulfurizer 52. This naphtha fraction is a relatively poor catalytic cracking stock, but is quite suitable as a light constituent of diesel fuel, as will be more fully shown subsequently. When the desulfurizer 52 is used the stock issuing therefrom may pass through a line 53 into a line 54 for transfer into a blending apparatus 55. A gas oil fraction having an initial boiling point in the range of from 450° F. to 500° F. and an end point in the range of about 750° F. to 950° F. is withdrawn from the fractionator 6 through a line 9 and passed into the catalytic cracking zone 11. This catalytic cracking zone is intended to include a preheater such as is necessary for heating the charge oil to the proper temperature for admission to the catalytic cracking chamber. The effluent from this catalytic cracking zone 11 passes through a line 12 and through the necessary cooling apparatus, not shown, into the fractionation zone 13. In this fractionation zone which may consist of one or more columns, as required, is separated a product consisting of normally gaseous hydrocarbons which is withdrawn through a line 14 for such disposal as desired. Residual material is withdrawn through a line 17 for passage to storage or subsequent use, as desired. Through a line 15 is withdrawn a gasoline fraction which is mixed with the previously mentioned gasoline fraction from line 7. A gas oil fraction is separated in the fractionation zone 13 and is withdrawn therefrom through the line 16 and is passed into the thermal cracking zone 18. This thermal cracking zone 18 is intended to include such preheating apparatus as will be required to heat the gas oil stock to a proper temperature for conversion in the zone 18. The effluent from the thermal cracking zone is withdrawn therefrom through line 19, which includes a cooling apparatus, not shown, and is passed into the fractionator 20. In this fractionation zone a gas product is removed through a line 21 and may or may not be combined with the gas in line 14. A residuum product from this fractionator 20 is removed through a line 24 and this product may be combined with the residuum in line 17 or may not be so combined, as desired. A gasoline product is withdrawn through a line 22 and may be combined with the gasoline in line 15. A gas oil product is also removed from this fractionator 20 and is passed through a line 23 which includes an exchanger or other apparatus for heating or cooling of this gas oil stream as desired. This gas oil at a proper temperature is then passed on into the solvent extraction zone 27 in which, for example, it contacts furfural as an extractant. This extraction unit may be a batch unit or may be a continuously operated unit, as desired, and includes means for separating raffinate from extract phase. Raffinate material leaves the extractor through a line 28 and is passed to the fractionator 30 in which solvent is separated from the raffinate by distillation and is returned through a line 31 to the extraction zone. The fractionator 30 also separates the raffinate oil into a light raffinate oil and a heavy raffinate oil, the heavy raffinate oil is passed through a line 32 into the catalytic cracking zone 11 as recycle oil. The light raffinate fraction is withdrawn from the fractionator through a line 33 and is passed into the blending apparatus 55 in which this light raffinate oil is mixed or blended with the naphtha stock from the original crude oil fractionation. The light raffinate oil has a relatively high cetane number, but the volatility is ordinarily somewhat lower than is customarily preferred. The naphtha fraction in line 54 is quite suitable for increasing the volatility to the desired range and still maintaining desirably high cetane number. The blend may be withdrawn from this blender through a line 56 as a premium diesel fuel and may be passed to a storage tank, not shown. The extract phase is removed from the extraction zone 27 through a line 29 and is passed into the separator or fractionator 34. In this fractionator solvent is distilled from the extract oil and the solvent is recycled through a line 35 into the extraction zone while the extract oil, which is highly aromatic in nature, is passed through a line 36 and a line 37 into the carbon black production furnace 38. The pipe 36 may conduct the highly aromatic extract oil into a run storage vessel, not shown, prior to passage through the charge line 37. Effluent from the carbon black furnace may pass through a line 39 which broadly may include a cooling system, and cooled gases containing suspended carbon black pass from line or cooling system 39 into the carbon black recovery system 40 which, as mentioned hereinbefore, may be any suitable means for separation of carbon black from the suspended gases. Recovered carbon black may be passed through a line 41 to shipment or to storage or to pelleting apparatus as desired.

If the original crude oil which enters our system through line 1 contains some aromatic hydrocarbons, it may be desirable to pass this oil through line 2 into a solvent extraction zone 3 which may employ furfural or any of the above named solvents. For removal of the aromatic constituents, this zone 3 is intended to include the steps for removal of the solvent from the extract phase and for removal of the solvent from the raffinate phase so that only extract oil passes through a line 5 and only raffinate oil passes through a line 4 into the charge line 1 for passage into the fractionation zone 6. In case a run storage tank is inserted between lines 36 and 37, it is intended that the extract oil from line 5 also pass into this run storage tank so that a blend of the extract oil from line 5 and the oil from line 36 will then pass through a line 37 into the carbon black producing apparatus.

The preheater apparatus hereinbefore mentioned in connection with the catalytic cracking zone 11 may be so operated as to heat the gas oil passing therethrough to a temperature of about 850° F. to 1150° F. with a pressure at the oil outlet of about 200 pounds per square inch gage. At such pressure and temperature the oil is then passed over a cracking catalyst at a space velocity within the range of about 0.5 to 5 volumes of oil per volume of catalyst per hour. Steam or other diluent may be added to the charge oil if desired. The gasoline produced by this catalytic cracking zone is a high anti-knock gasoline and may be further treated if desired prior to passage to storage. The catalytic gas oil, that is, the gas oil separated from the effluent of the catalytic cracking zone is heated to and maintained at a temperature in the range of about 900° F. to 1150° F. and at a pressure in the range of about 500 to 2000 pounds per square inch gage for the thermal cracking step. The gas oil separated from the thermally cracked effluents may have an initial boiling point ranging from about 450° F. to 500° F. and an end point of about 700° F. and an aniline point in the range of about 125° F. to 100° F., while the catalytic gas oil has an aniline point in the range of about 160° F. to 140° F. A portion of the thermal gas oil may be recycled into the thermal cracking step if desired to increase the depth of cracking, but usually this recycling is not necessary and is not a preferred operation. However, when it is desired to recycle some of the gas oil a line 25 connecting lines 23 and 16 is provided. The catalytic gas oil may be made to by-pass the thermal cracking step if desired, although the inclusion of the thermal cracking step is preferred since larger yields of low aniline point "high aromatic" oil are thus obtained.

The thermal gas oil is solvent extracted with, for example, furfural in the extraction zone 27 in the volume ratio of solvent to oil within the range of about 0.5 to 5 at a temperature in the range of from about atmospheric to 140° F. The two phases are separated and the solvent from the extract phase separated in unit 34 and the solvent separated from the raffinate phase in fractionator 30, both solvents being returned to the contacting zone 27. The separated raffinate oil may be withdrawn through line 33 as a diesel fuel or it may be recycled through line 32 to the catalytic cracking zone 11 since this raffinate material makes a good cracking charge stock. However, it is often preferable to fractionate the raffinate oil in the fractionator 30 to take from 60 to 75 per cent of the raffinate oil overhead and this overhead oil is then taken through line 33 into the blending tank 55 for blending with the naphtha product separated in the original fractionation for the production of diesel fuel. The mixed diesel fuel may then issue from line 56 as a high cetane fuel and may be passed to storage or to shipment as desired. The 25 to 40 per cent heavy raffinate oil bottoms, which also makes a good cracking stock, may be recycled through line 32 into the catalytic cracking zone 11.

The aromaticity of the extract oil as indicated by aniline point may be varied over a wide range by control of the numerous variables of our process, but it is generally controlled within the range of aniline points of about 25° F. to 65° F. Aniline points within this range are consistent with both high yield and high quality for the production of quality carbon black.

The extract oil may be conducted without cooling to a preheater where it is vaporized and continuously introduced at approximately the center of the inlet end wall of an unobstructed cylindrical reaction chamber in a direction parallel to the longitudinal axis of the reaction chamber at a rate in the order of $50(D)^3$ gallons per hour, where D is the diameter of the chamber in feet; air or an air-gas mixture is introduced into the chamber near its inlet end wall through a tangential port in the side wall, said port being directed tangentially with respect to the inside surface of the side wall and substantially perpendicularly with respect to the longitudinal axis of the chamber. The air or air-gas mixture is introduced at a rate of about 400 cubic feet per gallon of oil and at a velocity in the tangential port preferably in excess of 50 feet per second. The combustible mixture is burned to maintain the temperature in the chamber at 2100–2400° F. and to decompose the unburned oil to carbon black, said chamber being of at least sufficient length to produce carbon black substantially free of tarry materials. The effluent from the reactor is then quickly quenched to about 1250° F. with a water spray and then further cooled to about 450° F. by heat exchange with the oil charged to the thermal cracking step and/or the oil charged to the catalytic cracking step described above. The carbon black may be collected by such means as electrical precipitation. The combustion gases separated from the carbon black may be used as a diluent in the catalytic cracking step to replace the steam. The high aromaticity of the charge oil for the combustion reaction which can be obtained by this combination process gives improved qualities to the carbon black for rubber compounding.

The vaporized charge to the carbon black furnace is protected from excessive heating in the charge line to the furnace by jacketing this charge line with a larger concentric pipe and passing air into the furnace through the annular space. This jacket air is normally only a small part of the total air introduced to the reactor (2 to 10 per cent).

EXAMPLE I

A Panhandle virgin gas oil having a boiling range of about 350° F. to 750° F. was fractionated to obtain a naphtha with a boiling range of 350° F. to 500° F. and a gas oil with a boiling range of 500° F. to 750° F. This gas oil was then cracked over bauxite at a space velocity of 1.0 volume of oil per volume of catalyst per hour, a pressure of 10 p. s. i. g., a top catalyst bed temperature of 1040° F., and with a diluent in the amount of 30 pounds of steam per barrel of oil. These conditions gave a conversion of 48 volume per cent, 32 volume per cent of gasoline, 17 weight per cent of $C_4$ and lighter hydrocarbons, and 1.5 weight per cent of carbon. The gasoline produced had an unleaded octane number by the ASTM motor method of 81. The clean gas oil which amounted to 49 volume per cent of the oil charged to the cracking step had an aniline point of 160° F. This gas oil was then contacted with 2 volumes of furfural at a temperature of 110° F. The recovered raffinate oil amounted to 72 volume per cent and had an aniline point of 183° F. and the extract oil had an aniline point of 54° F. This low aniline point oil is a premium charge stock for carbon black manufacture.

The raffinate oil was then fractionated taking 65 per cent overhead. By blending this overhead fraction with the 350° F. to 500° F. boiling range naphtha a specification diesel fuel with a cetane rating of 59 was obtained. Cracking of the bottoms fraction of the raffinate oil under the conditions listed above yielded 34 volume per cent gasoline, 12 weight per cent of dry gas, and 1.8 weight per cent of carbon at a conversion of 50 volume per cent. The gasoline had an unleaded octane number by the ASTM motor method of 80.5.

EXAMPLE II

A Panhandle virgin gas oil having a boiling range of about 450° F. to 750° F., an API gravity of 36.5, and an aniline point of 190° F. was cracked over a bauxite catalyst at a space velocity of 1.0, a top catalyst bed temperature of 999° F., a pressure of 85 p. s. i. g., and with 62.0 pounds of steam per barrel of oil. Separation of the effluent yielded 11.3 weight per cent of gas, 34.1 volume per cent of gasoline having an octane number of 76.9 (ASTM, unleaded), 44.9 volume per cent of catalyst gas oil with an aniline point of 156° F., and 5.0 volume per cent of fuel oil. The catalytic gas oil was extracted at the conditions and with the results shown below:

Table I
CATALYTIC GAS OIL

| Solvent | Furfural | Methyl-cellosolve |
|---|---|---|
| Solvent to oil ratio | 2 | 1 |
| Temperature, °F | 110 | 79 |
| Extract, volume percent | 28.0 | 13.0 |
| Extract, Aniline point, °F | 54.3 | 51.5 |
| Raffinate, Aniline point, °F | 183.2 | 167.2 |

Table II
THERMAL GAS OIL—LIGHT TREATMENT (950° F., 1500 p. s. i.)

| | Thermal gas oil | Furfural | Methyl-cellosolve |
|---|---|---|---|
| Yield, vol. percent of Catalytic gas oil | 57 | | |
| Aniline Pt., °F | 118 | | |
| Solvent to Oil ratio | | 2 | 1 |
| Extract, volume percent | | 31 | 27 |
| Extract, Aniline point, °F | | 50 | 50 |

Table III
THERMAL GAS OIL—HEAVY TREATMENT (1060° F., 1500 p. s. i.)

| | Thermal gas oil |
|---|---|
| Yield, vol. percent of catalytic gas oil | 23 |
| Aniline point, °F | 50 |

From Table I it will be seen that the extraction of catalytic gas oil with furfural yielded 28 per cent by volume of extract based on the volume of the catalytic gas oil extracted and the extract had an aniline point of 54.3° F. This same oil when extracted with the "methylcellosolve" yielded 13 per cent by volume of an extract having an aniline point of 51.5° F. When the catalytic gas oil was thermally cracked and the gas oil separated from that treatment, extracted with furfural, the extract constituted 31 per cent by volume based on the volume of the catalytic gas oil thermally cracked and this thermal extract had an aniline point of 50° F. (See Table II.) When the thermal gas oil was extracted with "methylcellosolve" the extract yield was 27 per cent based on the volume of catalytic gas oil extracted and had an aniline point of 50° F. From these extraction volume values it may be seen that the thermal cracking treatment yielded a furfural extract of 31 per cent volume as compared to only 28 per cent volume when the thermal cracking treatment was omitted. The "methylcellosolve" extraction following the thermal cracking yielded 27 per cent by volume of extract in comparison to only 13 per cent when the thermal cracking was not used. Table III shows results of a heavy thermal cracking designed to produce a gas oil by thermal cracking alone having an aniline point of 50° F. Only 23 per cent of gas oil of this aniline point was produced in this heavy thermal cracking. This 23 per cent yield compares unfavorably with the 31 per cent and 27 per cent yields of extracts having aniline points of 50° F. Thus, our preferred operation is to catalytically crack followed by light thermal cracking of the catalytic gas oil and the thermally produced gas oil is solvent extracted with furfural. "Heavy" thermal cracking herein indicates cracking at 1000 to 1150° F. and "light" cracking indicates cracking at 900–1000° F.

The extract oil from the light thermal cracking having an aniline point of 50° F. was heated to 700° F. and charged to a reactor with a diameter of 15 inches at a rate of 100 G. P. H. using 36,000 C. F. H. of tangential air and 3000 C. F. H. of air at the annulus of the oil feed. These rates gave a temperature of 2200°–2300° F., a pressure of about 1 p. s. i. g. and a residence time in the reactor of about 0.095 second. The air velocity in the tangential burners was 110 feet per second and the estimated linear velocity in the reactor was 63 feet per second. These conditions gave a yield of 4.00 pounds of carbon black per gallon of oil charged. The preferred feed oil to the combustion process has the following specifications with the preferred limits as shown.

| | | Preferred Limits |
|---|---|---|
| API gravity | 18.5 | 16 to 25 |
| Color NPA | Dark | |
| Carbon residue, weight percent | 0.21 | |
| ASTM distillation, °F.: | | |
| IBP | 430 | |
| 5%, cond. @ 760 mm | 458 | |
| 10% | 422 | |
| 20% | 466 | |
| 30% | 472 | |
| 40% | 476 | |
| 50% | 482 | |
| 60% | 490 | |
| 70% | 502 | |
| 80% | 520 | |
| 90% | 568 | |
| EP | 654 | Approx. 700° F. |
| Recovery, percent | 99 | |
| Aniline point, about °F | 50 | Max. 100° F. |

The following tabulation summarizes the tests and lists properties of the several vulcanized rubber samples as further comparison of the properties of this carbon black, known as Philblack A, and several other commercial furnace blacks. These data show that in five properties the Philblack A is best for such uses as tire tread stock and above average in the remaining properties.

| Properties at 75 min. Vulcanization at 280° F. | Rating No. Philblack A | Rubber samples Containing Carbon Black | | | | | |
|---|---|---|---|---|---|---|---|
| | | A Philblack A | B | C | D | E | F |
| Abrasion (gm. loss) | 1 | 4.43 | 5.79 | 4.47 | 5.02 | 6.51 | 7.83 |
| Hardness (Shore) | 1 | 53.0 | 47.5 | 48.5 | 48.0 | 46.0 | 46.0 |
| Modulus 200% (p. s. i.) | 1 | 1,030 | 570 | 430 | 700 | 540 | 590 |
| Hot Tensile (break p. s. i.) | 1 | 1,030 | 720 | 870 | 780 | 630 | 750 |
| Heat Build-Up (ΔT, F) | 3 | 73.0 | 75.3 | 85.0 | 71.0 | 75.3 | 71.0 |
| Resilience (percent) | 3 | 63.4 | 62.0 | 58.2 | 64.0 | 62.8 | 64.4 |
| Hot Resilience (percent) | 3 | 78.0 | 75.2 | 72.0 | 78.1 | 77.7 | 79.2 |
| Tensile (p. s. i.) | 4 | 2,310 | 2,480 | 2,590 | 2,590 | 2,310 | 2,220 |
| Cold Tear (lb./in.) | 4 | 240 | 280 | 315 | 225 | 350 | 210 |
| Elongation (percent) | 6 | 390 | 510 | 570 | 490 | 535 | 510 |

Although the above tests show Philblack A to be inferior to the others in elongation, it should be pointed out that a low elongation is in keeping with the very high modulus of this black. Furthermore, actual road tests show that the elongation of this black is more than ample for use in tire treads and that this black imparts to tire treads more resistance to crack growth than commercial channel blacks, which are known to have a high elongation.

It will be obvious to those skilled in the art that many obvious alterations of our process, such as in the catalytic or thermal cracking conditions, solvent extraction operating conditions, the relative amount of raffinate distilled as diesel fuel stock, etc., may be made.

Valves, temperature and pressure recorders and controllers and other auxiliary but necessary apparatus, which is well known in the art, are not specifically disclosed for purposes of simplicity.

We claim:

A process for the conversion of high boiling range hydrocarbon oils, low enough in aromatic content to be suitable in that respect as diesel fuel, into high cetane number diesel fuel and other valuable products comprising separating from a crude oil a naphtha fraction boiling from 350° F. to 500° F. and a gas oil fraction boiling above 500° F., subjecting said gas oil fraction to catalytic cracking in the presence of a bauxite catalyst at a temperature within the range of 850° F. and 1150° F. and at a space velocity within the range of 0.5 to 5 volumes of liquid oil per volume of catalyst per hour, and from the cracking effluent separating a catalytic gas oil fraction, thermally cracking said catalytic gas oil at a temperature within the range of 900° F. to 1150° F. at a pressure of 500 to 2000 pounds per square inch, and from the thermal cracking effluent separating a thermal gas oil, solvent extracting this thermal gas oil with 0.5 to 5 volumes of furfural per volume of oil at a temperature within the range of atmospheric temperature to 140° F. to produce a raffinate phase lean in aromatic hydrocarbons and an extract phase rich in aromatic hydrocarbons, separating solvent from the raffinate phase, distilling overhead from 60 to 75 per cent of the remaining raffinate oil and blending the distilled raffinate oil with the first mentioned naphtha fraction boiling from 350° to 500° F. to produce an improved cetane diesel fuel, recycling the raffinate oil still bottoms into the catalytic cracking step, separating solvent from the extract phase to produce a highly aromatic extract oil, subjecting said extract oil to carbon black producing conditions in a reactor furnace at a temperature above 2100° F., and recovering the carbon black.

CARL J. HELMERS.
EUGENE V. MATHY.

REFERENCES CITED

The following references are of record in the file of this patent:

UNITED STATES PATENTS

| Number | Name | Date |
| --- | --- | --- |
| 2,228,510 | Dearborn et al. | Jan. 14, 1941 |
| 2,342,888 | Nysewander et al. | Feb. 29, 1944 |
| 2,361,080 | Bolt et al. | Oct. 24, 1944 |
| 2,366,490 | Cloud | Jan. 2, 1945 |
| 2,375,796 | Krejci | May 15, 1945 |
| 2,383,218 | Schulze | Aug. 21, 1945 |
| 2,429,875 | Good et al. | Oct. 28, 1947 |

OTHER REFERENCES

Woods: "The Petroleum Engineer," vol. 8, pages 58, 60, 62, 64, December 1936.

Dryer et al.: Ind. Eng. Chem., vol. 30, pp. 813–821 (1938).